Dec. 16, 1930. P. A. ARONSON 1,785,240
SEPARABLE FASTENER
Original Filed June 14, 1923
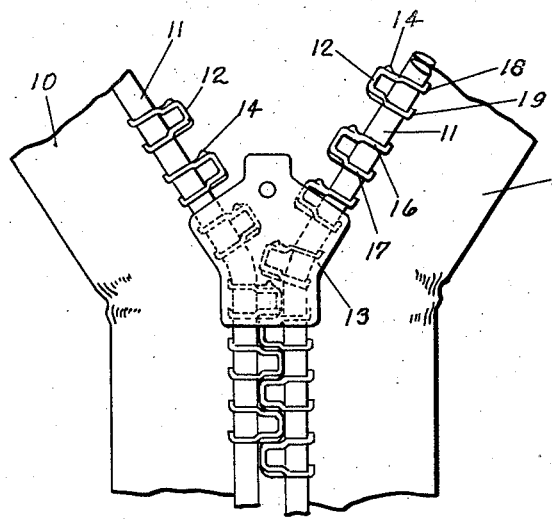
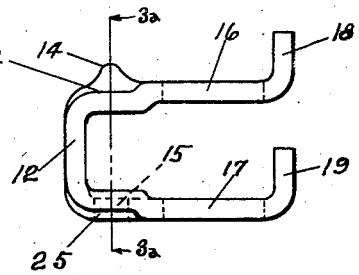
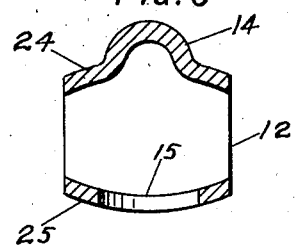
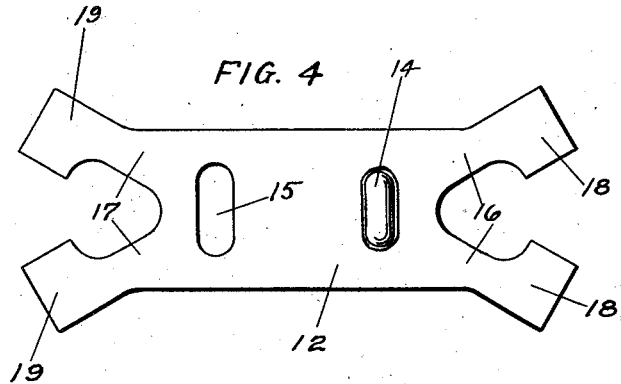
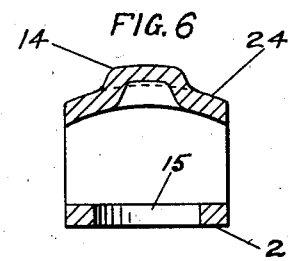
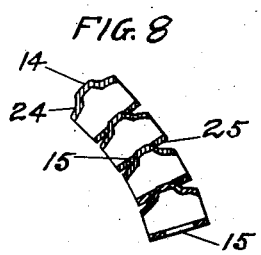
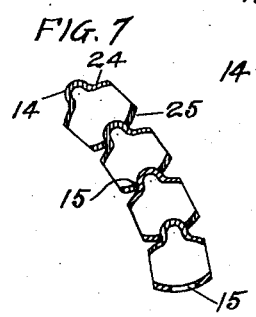
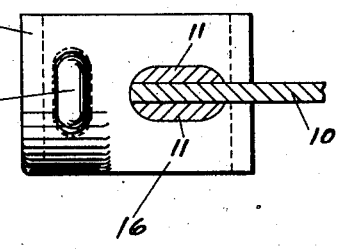
INVENTOR.
Peter A. Aronson,
BY
ATTORNEY.

Patented Dec. 16, 1930

1,785,240

UNITED STATES PATENT OFFICE

PETER A. ARONSON, OF RIVERCLIFFE, DEVON, CONNECTICUT, ASSIGNOR TO HOOKLESS FASTENER COMPANY, OF MEADVILLE, PENNSYLVANIA, A CORPORATION OF PENNSYLVANIA

SEPARABLE FASTENER

Original application filed June 14, 1923, Serial No. 645,223, and in Great Britain June 6, 1924. Divided and this application filed January 23, 1928. Serial No. 248,675.

This invention relates to separable fasteners of the slider controlled type and is a division of my copending application Serial No. 645,223, filed June 14, 1923 (Patent 1,671,921, issued May 29, 1928).

The objects of the invention are to provide a novel construction of interlocking members to increase flexibility and reduce friction; also to enable such members to be made of flat strip material; and more specifically to construct such members of flat strip material bent so as to require a minimum number per unit of length of tape with improved holding power.

In the recess and projection type of interlocking members disclosed herein, flexibility is increased and friction decreased by causing one to make a line or spot contact with the other, as distinguished from a surface to surface contact. This is attained by a novel construction whereby the cooperating interlocking members rock on the surfaces surrounding the projections and recesses instead of directly on the projections and recesses themselves. These surfaces are so formed that one makes a line or a spot contact with the other in locking and unlocking and in lateral flexing. In the preferred form of the invention, the surfaces around the projections and recess are transversely and convexly rounded, or one may be convexly rounded and the other straight. This construction facilitates locking and unlocking, and is conducive to lateral flexibility because the relative inclination between the coacting surfaces provides the required facility of movement and prevents disengagement. When members of this type are subjected to transverse strain when engaged, the relative inclination of the coacting surfaces tends to make one ride on the other and thus cumulatively increases the holding power.

In the form of the invention shown herein for purposes of illustration, the interlocking members are made from successive pieces of wire of general flattened cross section by being cut off to the desired length, then bent up after being stamped or perforated to provide a shell type of member each comprising separated pairs of compressible jaws for clamping to a tape, an oppositely disposed recess and projection, a bridging element connecting the spaced pairs of jaws, and slider guiding means parallel with the tape and forming a track on which the slider moves.

Referring to the drawing:

Fig. 1 is a plan view of a partially closed fastener having locking members embodying the invention;

Fig. 2 is an enlarged detail of one of the locking members shown in Fig. 1;

Fig. 3 is a transverse section taken on the line 3a—3a of Fig. 2;

Fig. 4 is a developed plan view of the locking member shown in Figs. 2 and 3 before being bent;

Fig. 5 is a top plan view showing the locking member clamped in position on a tape;

Fig. 6 is a transverse section through a locking member of modified construction;

Fig. 7 is a transverse section illustrating the fastener of Fig. 1 when transversely flexed; and Fig. 8 is a transverse section illustrating a fastener having locking members of a type shown in Fig. 6 when transversely flexed.

In the drawing, the stringers 10, preferably of woven tape, for example, have sewed thereto on opposite sides, braided or twisted cords 11 to form a beaded edge to which are secured a plurality of locking members 12 alternately arranged on the tape and adapted to be controlled by the slider 13. Each member 12 is formed from a piece of flat wire or strip metal bent back on itself in a general U, hollow shell or rectangular shape provided with interlocking portions comprising an interlocking projection 14 stamped or bent up on one side and a recess 15 on the opposite side with which the opposed locking members cooperate. The projection 14 is set inwardly from the edges of the locking member and the recess 15 is also set in from the edges of the member in substantial alignment with the projection. The projection 14 is rounded while the walls of the recess 15 are straight so that the surface of each projection will slide on the edge of its cooperating recess in locking and unlocking and in lateral flexing. The flat wire blank from which these members are formed has substantially parallel longitudinal edges and jaws 16 and 17 connected by a bridging element and formed by stamping out the metal occupied by a cross section of the corded edge of the stringer, spreading the jaws as shown in Fig. 4 in order to receive the edge of the tape, and then clamping the jaws to the stringer by compression as shown in Fig. 5, for example. The end portions of the jaw members are extended and bent to lie along the stringer, as shown in Fig. 2 where these end portions 18 and 19 are bent in the same direction to provide a track along which the slider travels.

In order to reduce the friction between the parts and thereby increase the flexibility of the fastener, the surfaces 24 and 25 around the projection and recess, respectively, are preferably tranversely and convexly rounded. When the fastener is closed the convexly rounded surface 24 of each member rests and rocks on the convexly rounded surface 25 of its cooperating member, these cooperating surfaces making only a line or spot contact instead of coinciding surface to surface as heretofore. In Fig. 6 only the surface 24 is convexly rounded while the surface 25 is substantially flat. In Fig. 6, furthermore, the projection 14 is flat and inclined and the recess 15 is substantially wider transversely than the projection to permit the projection of a similar locking member to move transversely therein without permitting separation when flexed. When the closed fastener is flexed transversely, as shown in Figs. 7 and 8, the cooperating surfaces 24 and 25 around the engaged recesses and projections rock freely on one another, and the surface of each projection 14 slides or pivots on an edge of its cooperating recess 15, the only contact between the cooperating parts being a line or spot contact so that only relatively small portions of the members will contact at any time. This materially reduces the friction between the parts in locking and unlocking and in lateral flexing, and thus increases the flexibility of the fastener. When the closed fastener is subjected to transverse strain the cooperating locking members tend to ride one on the other and thus cumulatively increase the locking effect due to the inability of the members to longitudinally separate at their rear ends where attached to the stringers. The strain at the back due to the riding at the front is taken up by slight tension on the tape between the members. This action is promoted by reason of the transverse and convex rounding of the surfaces around the cooperating projections and recesses, or one of them, which permits the locking members to ride freely on one another.

Among the advantages of this invention may be mentioned the simplicity of construction whereby a fastener member is stamped from a flat wire and bent to the desired shape without the previously necessary finishing operations, inasmuch as the sides of the wire form the side faces of the jaw members. The number of locking members per unit length of stringer may be varied by controlling the length of the bridging element between the jaws 16 and 17. The use of spaced clamping jaws in this construction provides a double grip on the tape and lessens the liability of the locking member slipping along the tape, and the space between the pairs of clamping jaws provides a suitable location for a bulge in the corded edge which is caused by the clamping action of the jaws, and is helpful to retain the locking member in place. The formation of the jaws in this construction is accomplished with a minimum waste of material. An important advantage resides in the method of obtaining flexibility in the fastener whereby the locking members rock on the surfaces surrounding the recesses and projections, with only small portions contacting, instead of directly on the projections and recesses themselves. By making the surfaces around the projection and recess transversely and convexly rounded, the friction between the cooperating locking members is materially reduced and the flexibility is increased in locking and unlocking and in lateral flexing.

Where the locking members are of the hollow type with a considerable space between the jaws 16 and 17, it may be desirable to use one or more overlapping flaps, as illustrated, for example, in Fig. 5 of Patent #1,432,219 to Sundback, dated October 17, 1922, to prevent granular or other material from passing through the locking members and leaking out of the container or whatever the fastener is applied to. The invention, however, is not limited to a construction having two pairs of clamping jaws with a space between them, or to a hollow shell locking member. Various changes may be made in the details of construction shown and described without departing from the scope and spirit of the invention as defined in the appended claims.

I claim:

1. A locking member for a separable fastener having a projection and a recess on opposite sides of the member, the surfaces around the projection being transversely inclined away from the projection toward the recess side of the member and the surfaces around said recess being transversely inclined away from the recess toward the projection side of the member to permit rocking of cooperating locking members on one another.

2. A locking member for a separable fastener having a projection and a recess on opposite sides both set in from the edges of said member, the surfaces around the projection being transversely inclined away from the projection toward the recess side of the member and the surfaces around the recess being transversely inclined away from said recess toward the projection side of the member to permit rocking of cooperating locking members on one another.

3. A locking member for a separable fastener comprising means for securing the same to a tape, a projection set in from the edges of said member, and a recess in substantial alignment with said projection, the surface around the projection and the surface around the recess being transversely rounded toward each other to facilitate rocking of one locking member on an opposite adjacent locking member.

4. A locking member for a slide type fastener formed to provide a projection and having a recess, means for clamping said member on a tape, the surface around the projection and the surface around the recess being transversely rounded toward each other to facilitate rocking of one locking member on an opposite adjacent locking member.

5. A locking member for a slide type fastener bent to provide a projection and having a recess, means for clamping said member on a tape, the surface around both the projection and recess being transversely and convexly rounded to facilitate rocking of one locking member on an opposite adjacent locking member when the fastener is flexed.

6. A locking member for a slide type fastener comprising a strip of material bent to provide a bridging element, jaws for clamping said member to a stringer, and a projection and a recess formed in said strip of material and disposed on opposite sides of said bridging portion, the surface around and immediately adjacent to both the projection and recess being transversely and convexly rounded to facilitate rocking of a corresponding surface of a similar locking member thereon.

7. A locking member for a slide type fastener comprising a strip of material bent in the middle having ends provided with compressible clamping jaws and having a projection adjacent the bend on one side and a recess adjacent the bend on the other side, the surfaces surrounding said projection and recess on said respective sides being transversely inclined toward each other.

8. A locking member for a slide type fastener comprising a flat strip of material bent in the middle, having ends provided with compressible clamping jaws and having a projection adjacent the bend on one side and a recess adjacent the bend on the other side, the surface around both the projection and recess being transversely and convexly rounded to facilitate rocking of one locking member on an opposite adjacent locking member when the fastener is flexed.

9. A locking member for a slide fastener comprising means for securing the same to a tape, a projection set in from at least one edge of said member, and a recess in substantial alignment with said projection, the surfaces immediately surrounding said projection and recess each being transversely rounded and convexed outwardly to facilitate rocking of one locking member on an opposite adjacent locking member.

10. A locking member for a slide fastener comprising means for securing the same to a tape, a projection and recess formed on opposite sides of said member, the surface of said side immediately surrounding said recess being transversely rounded and convexed outwardly to facilitate rocking of one locking member on an opposite adjacent locking member.

Signed at Rivercliffe, Devon, in the county of New Haven and State of Connecticut, this 19th day of January, A. D. 1928.

PETER A. ARONSON.